Aug. 15, 1933.  E. R. PIERCE  1,922,634
CONTROL FOR INFINITELY VARIABLE TRANSMISSIONS
Filed Dec. 15, 1932

Inventor
Earl R. Pierce
By Blackmore, Spencer & Fluit
Attorneys

Patented Aug. 15, 1933

1,922,634

UNITED STATES PATENT OFFICE 1,922,634

CONTROL FOR INFINITELY VARIABLE TRANSMISSIONS

Earl R. Pierce, Flint, Mich., assignor to General Motors Research Corporation, Detroit, Mich., a Corporation of Delaware Application December 15, 1932
Serial No. 647,299

6 Claims. (Cl. 74—97)

This invention relates to control mechanism for power transmission means for vehicles and has been designed for an infinitely variable transmission, particularly one of the friction roller type.

In transmission devices of this kind it has been proposed to employ a movable member to shift the position of the rollers relative to the driving and driven discs; to employ an arm rotatable by a governor responsive to the driving or driven shafts, preferably the former, and to make use of linkage between the governor actuated arm and the roller shifting member to change the driving ratio. There is also provided manually operable means to operate through said linkage to change said driving ratios.

My invention has for an object an improvement in the connection between the governor operated arm and the movable member of the transmission.

One object is to provide a construction whereby the leverage arms of both the governor actuated member and the manually operable member may be changed.

Another object is to so design the structure for changing the leverage that the change may be made without changing the driving ratio when that ratio is in its low speed position.

As another object the invention comprises the specific structure whereby the manual operation of the lever to secure speed ratio changes is effected by an instrumentality independent of that used for adjusting the leverage arms whereby such actuation of the lever for making changes in the driving ratio does not change the lever arm of the lever through which the governor operated arm functions.

Other objects and advantages will be understood from the following description.

Figures 1, 2:
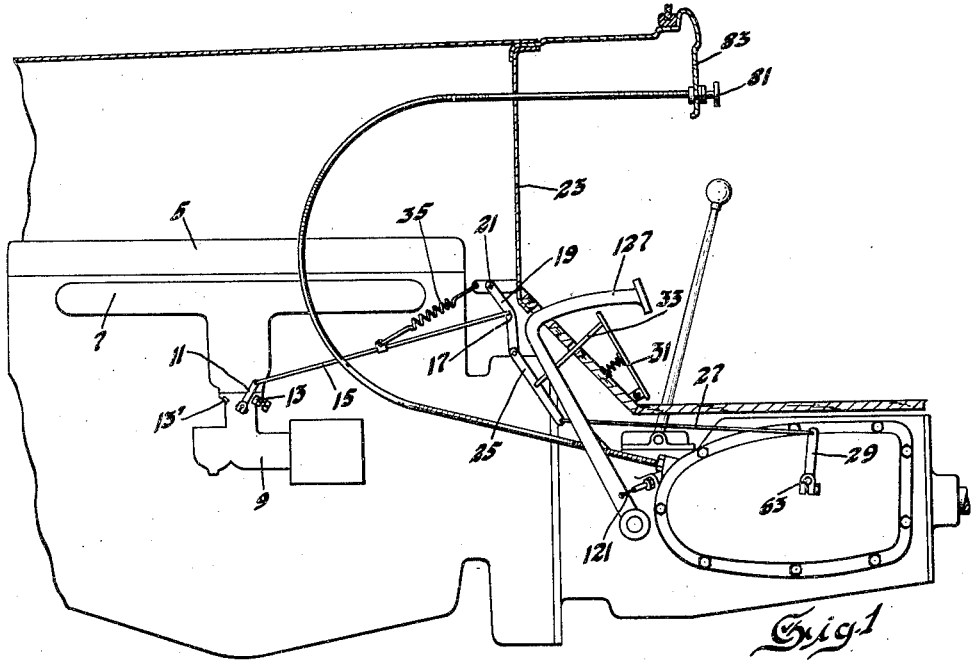
Fig. 1 is a view in side elevation of the motor and transmission of a motor vehicle, my invention being associated therewith.
Fig. 2 is a view in side elevation of the control mechanism per se.

Referring by reference characters to the drawing, numeral 5 represents the engine of a motor vehicle, 7 the intake manifold, 9 the carburetor, and 11 the throttle valve arm which is to engage stops 13 and 13' in its idling and full open positions respectively. The throttle lever is connected by a rod 15 to a mid portion 17 of a lever 19 pivoted at 21 to the dash 23. A differential lever 25 is pivoted at one end to the free end of lever 19. Its other end is connected by a link 27 to a lever arm 29 which is movable in a counterclockwise direction in changing the driving ratio to low speed as will be explained below. The accelerator pedal 31 is connected by a link 33 to a mid point of lever 25. A spring 35 anchored at one end and connected to link 15 at the other operates to hold the throttle in its idling position.

The engine functions to drive the vehicle through change speed mechanism including, in the illustrated embodiment, discs (driving and driven) one of which is shown at 37 and rollers such as 39. An input shaft governor (not shown) rocks an arm 41 in a clockwise direction as the speed of the shaft increases. A roller 43 on the end of arm 41 moves in a cam slot 45 of a swinging member 47, rotating on a fixed pivot 49. At 51 on lever 47 is the pivot of a differential lever 53. This lever has a slot 55 within which is a roller 57 on the end of a link 59, the latter pivoted on the end of a lever arm 61 carried by shaft 63, this being the shaft to which is secured arm 29 referred to above. Rotatable about the axis of shaft 63 is a hub 65 having an arm 67 connected by a link 69 to the arm 59. Hub 65 has another arm 71. A plate 73 is fixedly secured in position by fastening means 75, and has openings 77 to be engaged by a suitable spring detent carried by arm 71. A cable 79 is connected to arm 71 and terminates in a button 81 preferably on the instrument panel 83. By this means operation of the button rotates the hub 65 which, through the instrumentality of link 69, swings the link 59, its end moving in slot 55, thus changing the leverage whereby the governor arm 41 rocks the differential lever 53. Also, the accelerator pedal 31, after having opened the throttle to its maximum position, may rock lever 25 and through the link 27 also rock lever arm 29. Such rocking of 29 actuates the differential lever 53 through the link 59, turning the differential lever about its pivot 51 with the swinging member 47. This last described movement of the differential lever through the depression of the accelerator pedal operates to shift the gear ratio toward low speed as will be explained.

The rollers 39 are rocked by movements of the lever 53. These movements of lever 53 may be occasioned by the governor actuated arm 41 or by the swinging of arm 61 through the instrumentality of the accelerator pedal as explained above. The differential lever 53 performs the shifting movement by means of a rod 87 attached to the lever 53; a rod 89 attached to mechanism generally indicated as 91 operably connected to the friction roller system, and yielding means between said parts 87 and 89 not shown but enclosed in housing 93 which is attached to part 89.

Pivoted to the housing 93 is a link 95 terminally pivoted to a double arm lever 97 rotatable about a fixed pivot 99. The work arm of lever 97 is curved as shown by numeral 101. It enters a dashpot constituted by a casing 103 pivoted at 105 and also including an arcuate neck portion 107 secured thereto. A sealing boot 109 connects the lever 97 to the opening of part 107. The piston 111 has a spherical contour and is preferably provided with a restricted passage extending therethrough. It is pivoted at 113 to the aforesaid lever arm 101. The part 107 has a lug 115 provided with an opening 117. A stop pin 119 extends through the opening 117 and limits the swinging of the dashpot about its pivot 105. A cable 121 is connected by a coupling 123 with a spring 125 which spring is attached to the lug 115. This cable is preferably attached at its other end to the brake pedal 127 to the end that the application of the brake may rock the dashpot casing relative to its piston, thereby permitting the flow of fluid around the periphery of the piston and prevent the effect of the dashpot in retarding the shift to low speed when the brake is applied to stop the vehicle. The points of articulation associated with the dashpot are such as to permit its action without materially flexing the sealing boot and to prevent any considerable change in the cubicle contents within the dashpot. The spring 125 is provided in the linkage in order that the brake pedal 127 may be further depressed after the dashpot has moved sufficiently to engage the stop 119.

Spring 129 is anchored on pivot pin 105 and is attached to the end of lever 61. This spring is of such strength relative to spring 35 that it offers sufficient resistance to the rotation of lever 25 through the link 27 to ensure that the throttle may be opened to its widest position before the accelerator pedal operates to rock the differential lever. It will be understood that this rocking of the differential lever is such as to tend to force the driving ratio toward low speed position and thereby secure maximum acceleration with the engine at full throttle.

I claim:

1. For use in controlling an infinitely variable transmission, a movable part for changing the driving ratio, a differential lever, linkage connecting one arm of said lever to said movable part, speed-responsive means to rock said differential lever, manually operable means to rock said lever, means to vary the mechanical advantage through which each of said means is operable upon said differential lever.

2. For use in controlling an infinitely variable transmission, a movable part for changing the ratio effected by said transmission, a differential lever, linkage connecting one arm of said lever to said movable part, speed responsive means to rock said differential lever, manually operable means to rock said lever, each of said means operable about the connection of the other with the lever, other manually operable means to adjust the point of connection of the first manually operable means with the differential lever whereby the work and power arms of the differential lever are changed.

3. The invention defined by claim 2, said differential lever having a slot to adjustably receive the connection of the first mentioned operable means.

4. The invention defined by claim 2, said differential lever having a slot to adjust the connection of the first manually operable means, said slot constituting the arc of a circle in which said connection is moved by the other manually operable means for that position of the differential lever corresponding to low speed ratio.

5. The invention defined by claim 2 together with a plurality of remote control elements to independently move both said manually operable means.

6. The invention defined by claim 2, said manually operable means jointly comprising a rock shaft, an arm thereon, a link pivoted to said arm and carrying at its end that fulcrum for the differential lever about which the speed responsive means rotates the lever, a hub rockable about the axis of said rock shaft, an arm on said hub, linkage for said arm whereby the hub may be rotated, a second arm on said hub, a connection between the second arm and the link whereby the actuation of the linkage rocks the hub about the rock shaft and turns the link about its connection with the first-mentioned arm, whereby such adjustment may not increase the speed ratio of the transmission when in low speed position and whereby rocking of the rock shaft may rotate the differential lever about its connection with the speed responsive means.

EARL R. PIERCE.